US005452314A

United States Patent [19]
Aronson

[11] Patent Number: 5,452,314
[45] Date of Patent: Sep. 19, 1995

[54] CONTROLLABLE-BIREFRINGENCE, ACOUSTO-OPTIC TUNABLE FILTER AND A LASER TUNED BY THE SAME

[75] Inventor: Lewis B. Aronson, Los Altos, Calif.

[73] Assignee: Hewlett-Packard Company, Palo Alto, Calif.

[21] Appl. No.: 283,455

[22] Filed: Aug. 1, 1994

[51] Int. Cl.⁶ .................................................. H01S 3/10
[52] U.S. Cl. .......................................... 372/20; 372/13; 359/308
[58] Field of Search ........................ 372/20, 13, 9, 105; 385/1, 28, 4, 285, 305, 308, 309, 314

[56]  References Cited

U.S. PATENT DOCUMENTS

| 3,655,265 | 4/1972 | Hammond | 250/149 |
| 3,679,288 | 7/1972 | Harris | 250/199 |
| 3,822,379 | 7/1974 | Brienza | 250/199 |
| 3,862,413 | 1/1975 | Brienza | 250/199 |
| 4,684,215 | 8/1987 | Shaw et al. | 385/4 |
| 4,781,425 | 11/1988 | Risk et al. | 385/28 |
| 5,002,349 | 3/1991 | Chevng et al. | 385/1 |

OTHER PUBLICATIONS

H. Hermann et al., "Integrated Optical, TE—and TM-Pass, Acoustically Tunable, Double-Stage Wavelength Filters in LiNbO₃", Electronics Letters, vol. 28, No. 7, Mar. 26, 1992, pp. 642–644.
H. Hermann et al., "Integrated Acousto-Optical Mode-Convertors with Weighted Coupling Using Surface Acoustic Wave Directional Couplers", Electronics Letter, vol. 28, No. 11, May 21, 1992, pp. 979–980.
D. A. Smith et al., "Sidelobe Suppression in an Acousto-Optic Filter with a Raised-Cosine Interaction Strength", Integrated Photonics REsearch, 1992 Technical Digest, vol. 10, pp. 88–91. (no month).
Arjun Kar-Roy et al. "Low-Sidelobe Weighted-Coupled Integrated Acoustooptic Tunable Filter Using Focused Surface Acoustic Waves", IEEE Photonics Technology Letters, vol. 4, No. 10, Oct. 1992, pp. 1132–1135.
W. R. Trutna et al., "Anomalour Sidelobes and Birefringence Apodizatin in Acousto-Optic Tunable Filters", Optics Letters, vol. 18, No. 1, Jan. 1993, pp. 28–30.
X. F. Cao, "Electro-Optic Tuning and Modulation of Second Harmonic Generatin in Quasi-Phase Matched LiNbO₃ Waveguides", Integrated Photonics Research, 1993 Technical Digest, vol. 10, pp. 463–466. (no month).

Primary Examiner—Léon Scott, Jr.

[57] ABSTRACT

An acousto-optic tunable filter ("AOTF") with a pair of electrodes on opposite sides of the waveguide. A voltage source applies a potential across the electrodes, thereby creating an electric field through the waveguide. The electric field controls an optical property of the waveguide by altering the birefringence of the waveguide. Suitably adjusting the potential applied by the voltage source results in suppression of sidelobes, correction of asymmetric sidelobes, and compensation for physical variations in the waveguide. The AOTF can be tuned very rapidly by a tuning voltage applied to the electrodes. In combination with a thermistor, the control voltage can compensate for changes in temperature. A spatially-varying electric field is generated by using a set of electrodes at different potentials, or by using a resistive element as an electrode, or by shaping the electrodes according to the desired field. A rapidly-varying control voltage can modulate a light beam in the filter. The AOTF finds an application as the tuning element of an external-cavity tunable laser.

26 Claims, 14 Drawing Sheets

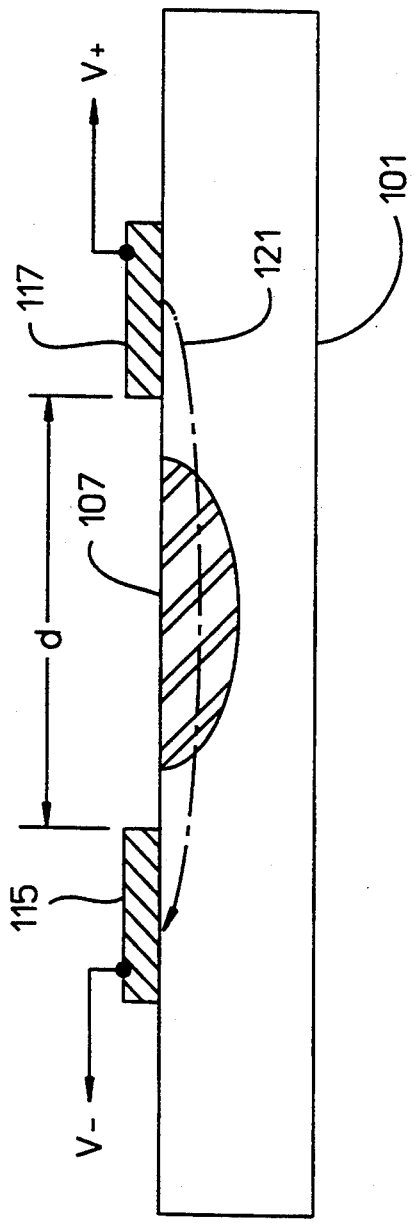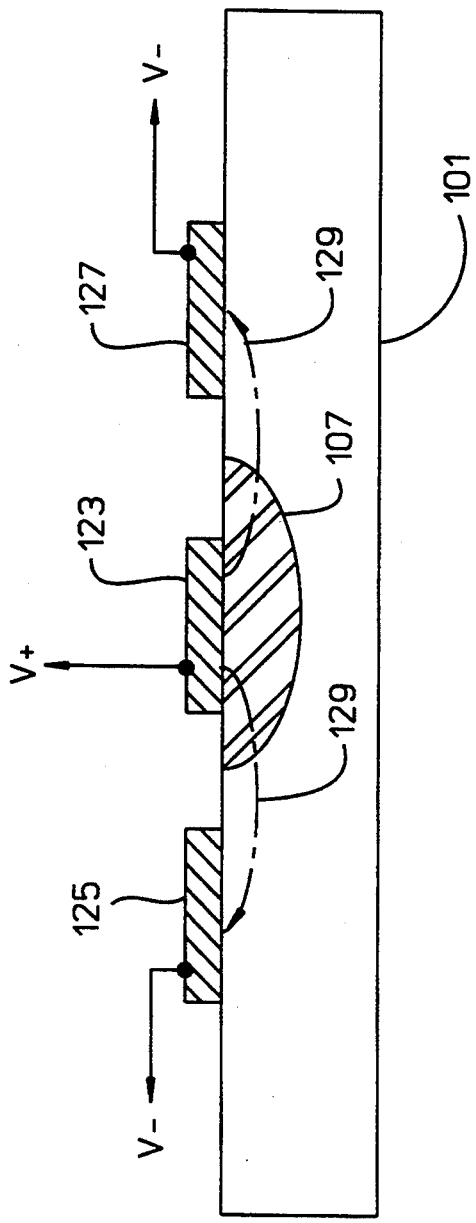

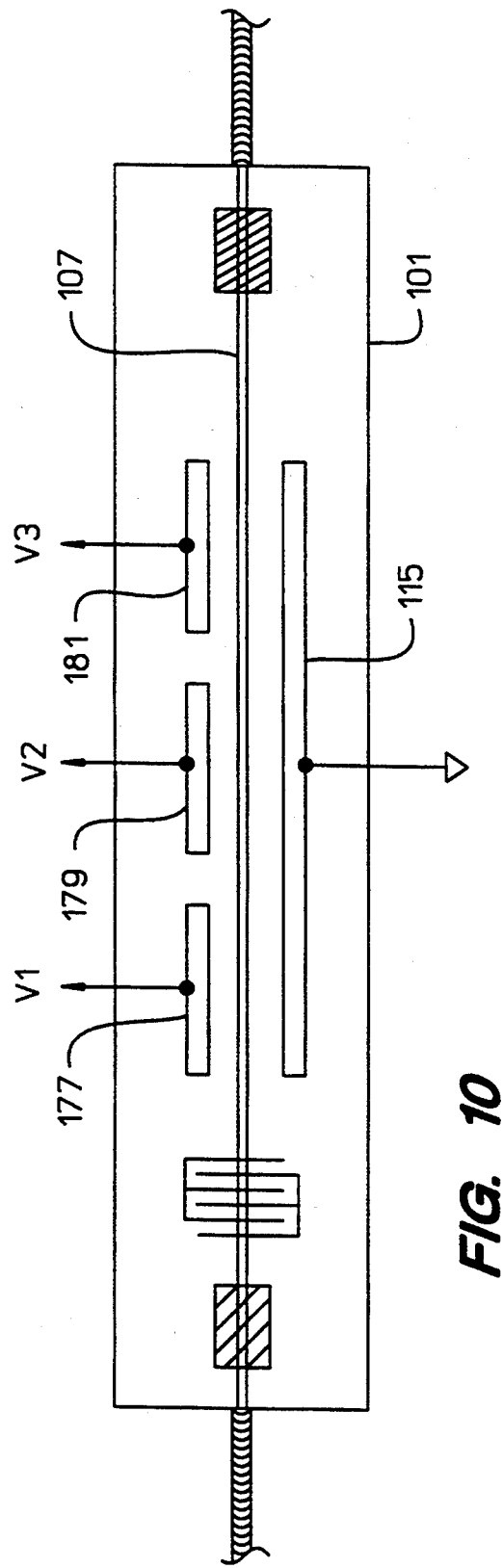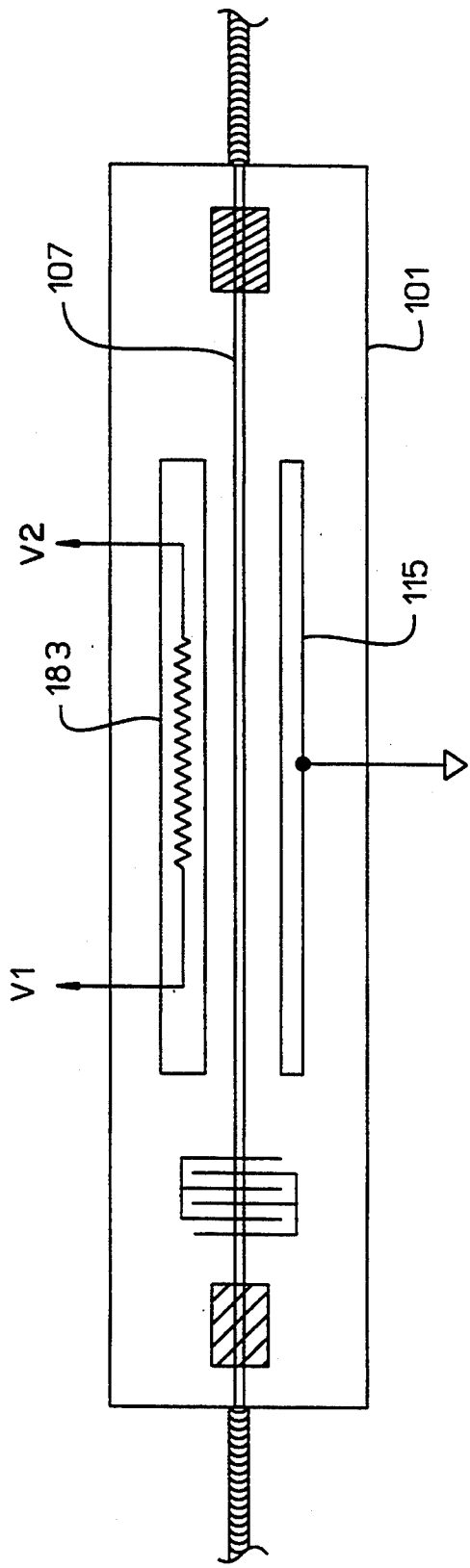

CONTROLLABLE-BIREFRINGENCE, ACOUSTO-OPTIC TUNABLE FILTER AND A LASER TUNED BY THE SAME

FIELD OF THE INVENTION

This invention relates generally to optical devices and more particularly to an acousto-optic tunable filter that uses an externally-generated electric field for controlling birefringence and altering filter properties and a laser tuned by such a filter.

BACKGROUND OF THE INVENTION

A theoretically-ideal bandpass filter passes any energy having a frequency within a desired frequency band and blocks any energy having a frequency outside the desired band. Similarly, an ideal notch filter blocks all energy having a frequency within a specified band and passes all other energy. The response curve of an ideal bandpass filter is shown in FIG. 1; the response curve of an ideal notch filter is shown in FIG. 2. In everyday terms, an example of an ideal bandpass filter would be a tuning circuit that would tune a radio to receive a desired station with perfect fidelity while totally rejecting all other stations, even a much stronger one in an adjacent frequency band. In the optical range, an ideal filter would allow, say, red light to pass at full brightness while totally blocking light of all other colors.

For many reasons, theoretically ideal filters cannot be achieved in practice. A good, practically realizable filter is generally considered to be a filter having a response that is essentially flat throughout the desired pass band and that smoothly drops off with either increasing or decreasing frequency outside the pass band. The response curve of a good realizable bandpass filter is shown in FIG. 3.

An acousto-optic tunable filter ("AOTF") is an electronically tunable optical bandpass filter. Bulk AOTFs—that is, AOTFs fabricated in bulk crystals and using bulk acoustic waves and unguided optical beams—have already found many important applications in laser and optics systems. Integrated AOTFs—AOTFs in which light is confined to a waveguide and which use surface acoustic waves—are also expected to find important applications in laser and fiber optics systems, especially such as are used in modern telecommunications applications. The construction and operation of an integrated AOTF will now be explained with reference to FIG. 4.

An integrated AOTF is fabricated in an elongated crystalline substrate 11 such as lithium niobate (LiNbO$_3$). An optical waveguide 13 is formed in an upper surface of the substrate, for example by indiffusion of titanium. A beam of light is coupled into a first extremity 15 of the waveguide 13 through an input optical fiber 17. The light propagates through the waveguide and out through an output optical fiber 19. A surface acoustic wave is induced in the waveguide by an interdigitated transducer 21. The transducer is driven by an externally-generated electrical signal; the frequency of the acoustic wave is determined by the frequency of the electrical signal.

The acoustic wave induces a diffraction grating in the waveguide, and this in turn diffracts the beam of light. The grating couples the transverse electric and transverse magnetic polarization modes of the light, but only within a narrow band of optical wavelengths. Thus, within this narrow band all the light propagating in one polarization mode is converted to the orthogonal mode, whereas outside this band the polarization mode of the light is unaffected.

A TE pass polarizer 23 adjacent the first extremity of the waveguide blocks any incoming light that is not in a first polarization mode. Thus, only light polarized in the first mode is admitted to the filter. As the light travels through the waveguide, the polarization mode of any of the light having a wavelength within the aforesaid narrow band of optical wavelengths is converted to a second mode which is orthogonal to the first mode. The polarization of the rest of the light is unaffected. A TM pass polarizer 25 opposite the polarizer 23 blocks from the output any light that is not in the second polarization mode. Thus, only light having a polarization mode that has been converted while passing through the filter is allowed to exit the filter. No output destination is shown, but it will be understood that the output light is ultimately provided to a user or to an optical device of some type.

From the foregoing it will be seen that the AOTF passes light having a wavelength within the band determined by the acoustic wave and blocks other light. Thus the AOTF serves as a bandpass filter. The center frequency of the pass band can be tuned by changing the frequency of the electrical signal that drives the transducer. The filter may be converted into a "notch" filter by changing the polarizer 25 to the same type of polarizer as the polarizer 23

The polarizers 23 and 25 are shown as having been integrally formed in the substrate 11. However, one or both of these polarizers may be fabricated as separate devices and located remotely from the substrate 11 in the input and output light paths, respectively. Indeed, the polarizer 23 may be omitted entirely if the input light is already polarized, and the polarizer 25 may be omitted if the user or optical device that receives the output light is able to discriminate among polarization modes.

As the light passes through the waveguide and is diffracted by the acoustic wave, the frequency of the light is Doppler-shifted because the grating induced by the acoustic wave is in motion with respect to the waveguide. If desired, this Doppler shift can be cancelled by passing the light through a second AOTF. Although two physically separate AOTFs could be used, it is often advantageous to fabricate two AOTF stages in two adjacent sections 27 and 29 of the waveguide 13. In such a configuration the acoustic wave generated by the transducer 21 is confined to the first waveguide section 27 by acoustic absorbers 31 and 33. The acoustic absorbers may be fabricated of wax or other convenient materials. A second transducer 35 generates a second acoustic wave in the second waveguide section 29. This second acoustic wave is confined to the second waveguide section by acoustic absorbers 37 and 39.

A third polarizer 41, similar to the first polarizer 23, is located on the output end of the second waveguide section 29. If all three polarizers are the same type, a two-stage notch filter is formed. If the polarizer 25 passes only light that is orthogonally polarized to the light passed by the polarizers 23 and 41, a two-stage bandpass filter is formed.

Although a configuration with two transducers is shown, it may be preferable to use only one transducer to generate the acoustic waves in both sections of the waveguide. In such a configuration the acoustic absorbers 33 and 37 that lie between the two sections 27 and 29 are omitted. A single transducer generates the wave throughout both sections of the waveguide; the transducer may be located at any convenient point along the waveguide.

Unfortunately the frequency response of an AOTF is not like that of the good bandpass filter as shown in FIG. 3. Instead, the frequency response of an AOTF is characterized by unwanted sidelobes. Even in theory, the best performance that can be expected from a basic single-stage AOTF is sidelobes not more than ten decibels ("dB") below the center frequency, as explained by Harris et al., *Journal of the Optical Society of America*, vol. 59, page 744 (1969). In practice, single-stage AOTF sidelobes are often much less than ten dB below the center frequency. Even worse, the sidelobes are not symmetrical. A response curve of a typical AOTF, showing the asymmetric sidelobes, is provided in FIG. 5.

Various methods of reducing these unwanted sidelobes have been proposed, and by way of example some of these proposals are discussed in Kar-Roy et al., *IEEE Photonics Technology Letters*, vol. 4, page 1132 (1992); Smith et al., *Integrated Photonics Research*, Vol. 10 of 1992 OSA Technical Digest Series (Optical Society of America, Washington) pp 88–89; Herrmann et al., *Electronics Letters* Vol. 28, page 979 (1992); and Herrmann et al., *Electronics Letters*, Vol. 28, p. 642 (1992).

An explanation of why unsymmetric sidelobes occur, and a proposal for eliminating them, may be found in Trutna et al., "Anomalous Sidelobes and Birefringence Apodization in Acousto-Optic Tunable Filters", *Optics Letters*, Vol. 18, No. 1, Jan. 1, 1993. In brief, Trutna et al. showed that the undesired sidelobes result from birefringence nonuniformity in the waveguide. This nonuniformity in turn has several causes including thermal gradients, waveguide width variations, titanium thickness variations, and inhomogeneity in the $LiNbO_3$ substrate. Trutna et al. also showed how these variations might be intentionally used to reduce sidelobes in a two-section AOTF.

Integrated AOTFs are expected to find a particularly important application in making tunable lasers. Although various methods of tuning certain kinds of lasers are known, all of these methods suffer from such drawbacks as slow response, mechanical complexity, drift over time, and relatively high cost. The integrated AOTF offers the potential of overcoming many of these drawbacks if its filter function characteristics could be improved.

In view of the foregoing, it will be seen that there is a need for a way to improve the filter function characteristics of AOTFs so that the advantages which in theory can be obtained from these devices may be realized.

SUMMARY OF THE INVENTION

The present invention provides an acousto-optic tunable filter ("AOTF") in which an applied electric field controls the birefringence of the filter, greatly improving the filter function and making it possible to electronically tune the filter across a range of center frequencies. A tunable laser incorporating such an AOTF is also provided.

Briefly and in general terms, an AOTF embodying the invention includes a base made from acousto-optic material, control means for controlling birefringence of the acousto-optic material, and a transducer that induces an acoustic wave in the base. In operation, an input light beam that is to be filtered is guided into one end of the base. The acoustic wave changes the polarization mode of this input light if the light has a frequency within an optical frequency band defined by the frequency of the acoustic wave and the optical properties of the base. The polarization mode of light having any other frequency is not affected. The control means includes a plurality of electrodes adjacent the base and a voltage source that establishes a potential across the electrodes. This potential results in an electric field that extends through the base. The electric field alters the birefringence of the acousto-optic material and thereby changes an optical property of the base. This in turn controls how the light is affected as it travels through the base.

Input and output polarizers may be disposed on either end of the base such that an input beam of light passes through the input polarizer, then the base, and then the output polarizer. In one embodiment both polarizers are transmissive of light polarized in a first mode and attenuative of light polarized in a second mode. Only light polarized in the first mode is admitted into the base. Any light having a frequency within the frequency band defined by the frequency of the acoustic wave and the optical properties of the base is converted to the second polarization mode, but light outside this frequency band is unaffected. Because the output polarizer blocks any light in the second polarization mode, only the light outside the defined frequency band is passed through to the output of the filter. Accordingly it will be seen that this configuration of polarizers defines a notch filter that attenuates light within the defined frequency band.

In another embodiment the input polarizer is transmissive of light that is polarized in a first mode and the output polarizer is transmissive of light that is polarized in a second mode orthogonal to the first mode. This configuration defines a bandpass filter that attenuates light outside the defined frequency band.

The invention is preferably embodied in an integrated AOTF of the kind in which a waveguide is formed by indiffusion of a strip of titanium into a surface of a lithium niobate crystal. The input and output polarizers may be integrally formed in the crystal or they may be remotely located at convenient points in the input and output optical paths. One or both of them may be omitted entirely if the input light is already polarized or if the ultimate recipient of the light can distinguish among different polarization modes.

The voltage that is applied to the electrodes is adjusted as desired to control one or more of several attributes of the AOTF. For some purposes a DC voltage is used. This voltage adjusted to compensate for fabrication defects in the crystalline structure. In another embodiment the voltage compensates for temperature drift or other environmental effects. For example, a temperature-sensing element may be used to control the voltage according to the temperature of the structure and thereby minimize any drift in the filter center wavelength as a result of changing temperatures.

The voltage may also be used to tune the filter to a desired frequency band or to modulate a beam of light passing through the structure.

It may be desirable to have electric fields of differing strengths at different locations along the structure. This is accomplished, for example, by using several pairs of electrodes and applying a different potential to each pair, by using a resistive element as an electrode, or by using a specially-shaped electrode.

Two adjacent AOTFs may be configured in series in a single substrate by locating a midsection polarizer between first and second sections of the waveguide, each section defining a filter stage. Of course, more than two filter stages may be formed in the substrate by using more midsection polarizers to divide the waveguide into more sections as desired.

A two-stage AOTF embodying the principles of the invention offers several advantages. In one embodiment the second stage is used merely to compensate for any Doppler shift induced by the first stage. In another embodiment the voltage applied to one stage is adjusted to suppress sidelobes on one side of the center frequency of the passband and the voltage applied to the other AOTF is adjusted to suppress sidelobes on the other side of the center frequency, thus providing a two-stage bandpass filter with greatly attenuated sidelobes on both sides of the pass band.

In another embodiment of a two-stage AOTF, the voltage source receives a modulation signal and modulates the light beam by applying a potential that detunes the first stage in one direction and the second stage in the opposite direction. And in yet another embodiment the voltages applied to each stage are adjusted to tune the stages to the same optical frequency, counteracting any factors that may have detuned the filter stages with respect to each other.

The present invention provides a method of controlling an AOTF. The method includes the steps of generating an electric field, applying the electric field across an AOTF, and controlling the intensity of the electric field to modify an optical transmission parameter of the waveguide. In one embodiment the method includes sensing the temperature of the filter at one or more locations and applying an electric field at each such location to compensate for any adverse effects of changes in temperature.

A bandpass AOTF according to the invention is advantageously included in the optical path of an external-cavity laser to provide an electronically-tunable laser characterized by the ability to change frequencies very rapidly in response to changes in the voltage that controls the birefringence of the AOTF.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 7 is a cross-sectional view taken through the line 7—7 in FIG. 6.

FIG. 8 is a cross-sectional view similar to that of FIG. 7 but depicting an alternate configuration of electrodes.

FIG. 10 is a schematic of an AOTF similar to that shown in FIG. 6 but with a plurality of subelectrodes on one side of the waveguide.

FIG. 11 is a schematic of an AOTF similar to that shown in FIG. 6 but with a resistive element used as one of the electrodes.

DESCRIPTION OF THE PREFERRED EMBODIMENTS

This invention provides an acousto-optic tunable filter ("AOTF") which uses an electric field to control optical properties of the filter by adjusting the birefringence of the acousto-optic material of which the filter is made. There has been a need for a way to control the optical properties of an AOTF and thereby improve its filter function. There has also been a need for a better way to electronically tune an AOTF. Existing approaches have not been adequate.

An AOTF according to the invention is equipped with electrodes on either side of the waveguide and a voltage source that applies a potential across the electrodes to generate the electric field. Such an AOTF offers greatly improved performance. Using an electric field to alter the birefringence of a two-stage bandpass filter can reduce the sidelobes to more than 18.6 dB below the peak response at the center of the pass band. The voltage source is adjustable to provide a potential to compensate for fabrication defects or for environmental effects. The AOTF can be tuned very rapidly by changing the voltage. A beam of light passing through the AOTF can be modulated by applying a modulating signal across the electrodes. The invention finds an application in a tuning element of an electronically-tunable laser.

Figure 6:
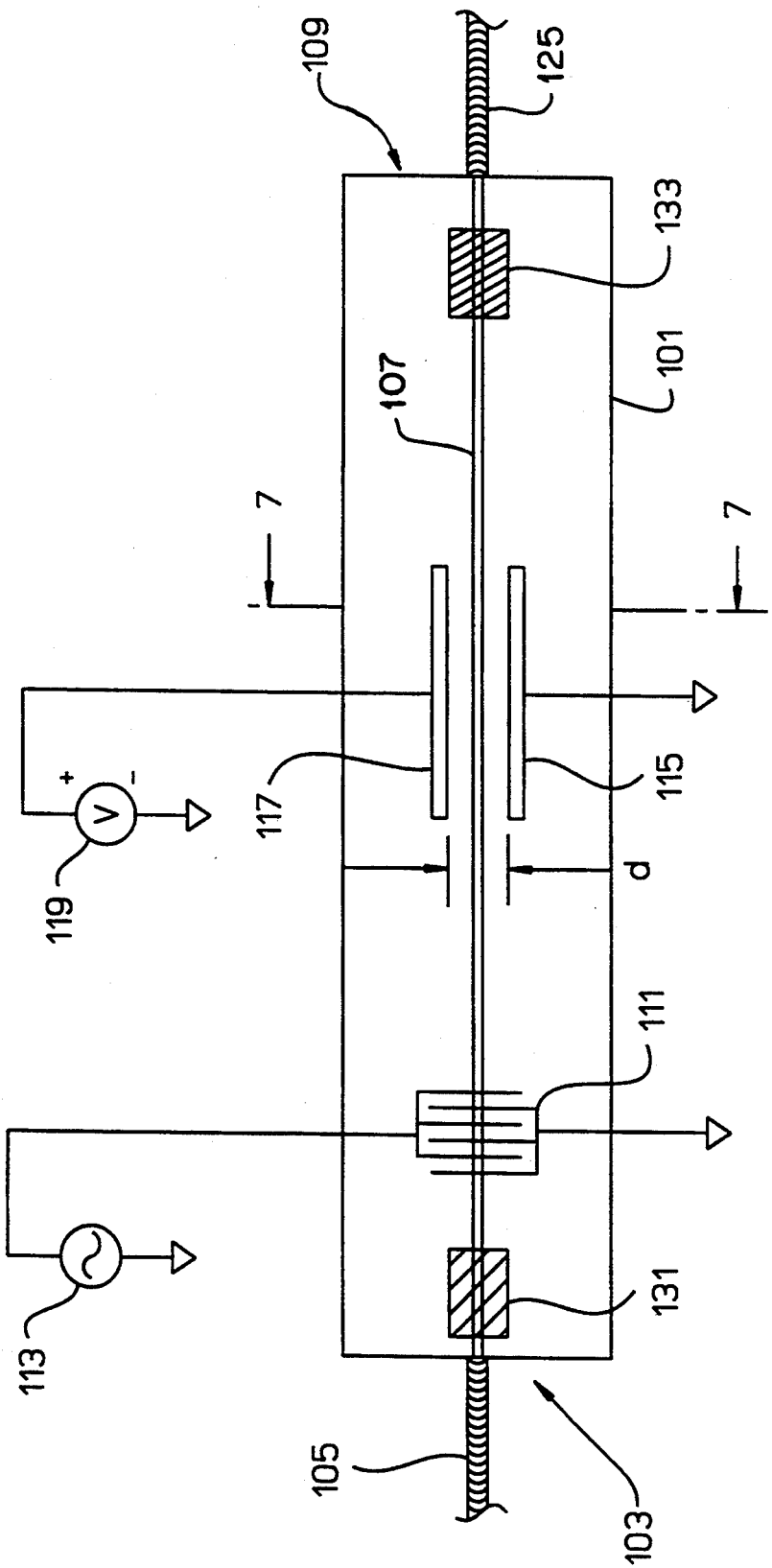
FIG. 6 is a schematic diagram of an AOTF according to the invention.

Referring now to FIG. 6, an AOTF according to the invention is fabricated in a base 101 of acousto-optic material. The base has a first extremity 103 adapted to receive an incoming beam of light, for example from an input optical fiber 105. This embodiment is illustrated as an integrated device in which a waveguide 107 is formed in an upper surface of the base 101 and extends from the first extremity of the base 103 to a second extremity 109, but it will be apparent that the principles of the invention are also applicable to a bulk device, that is, an AOTF fabricated in a bulk crystal without a waveguide. An integrated AOTF as illustrated is preferably fabricated of a crystalline material such as lithium niobate ($LiNbO_3$); the waveguide 107 is formed by indiffusion of titanium or another suitable material.

A transducer 111 is responsive to an electrical signal to induce an acoustic wave in base. The electrical signal is provided by an external voltage source 113. The frequency of the acoustic wave and the optical properties of the base define an optical frequency band. In the waveguide, the acoustic wave changes the polarization mode of any light having a frequency within the defined optical frequency band. However, the polarization mode of any light having a frequency outside this optical frequency band is not affected.

Control means are provided to control an optical property of the base by adjusting the birefringence of the acousto-optic material of which the base is made. Preferably the control means comprises a plurality of electrodes 115 and 117 adjacent the base and a voltage source 119 in electrical communication with the electrodes. The voltage source establishes a potential across the electrodes and thereby generate an electric field that extends through the waveguide.

In the embodiment shown in FIG. 6, the electrodes 115 and 117 are located on the upper surface of the base, parallel the waveguide, and on opposite sides thereof, as best shown in FIG. 7. The electrode 117 is connected to a positive terminal of the voltage source 119 and the electrode 115 is connected to a negative terminal of the voltage source. An arrow 121 represents the electric field extending from the electrode 117 through the waveguide to the electrode 115.

In another embodiment, shown in cross-section in FIG. 8, an electrode 123 is located on top of the waveguide and two other electrodes 125 and 127 are placed on the upper surface of the base on either side of the waveguide. The electrode 123 is connected to the positive terminal of the voltage source and the electrodes 125 and 127 are connected to the negative terminal. Arrows 129 represent the electric field extending from the electrode 123 through the waveguide to the electrodes 125 and 127.

In one embodiment input and output polarizers 131 and 133 are disposed adjacent the opposite extremities 103 and 109 of the base such that an input beam of light passes through the input polarizer 131, then the waveguide 107, and then the output polarizer 133, the input polarizer and the output polarizer both being transmissive of light polarized in a first mode and attenuative of light polarized in a second mode. This configuration defines a notch filter that passes light having a frequency outside the defined optical frequency band and attenuates light having a frequency within that band.

A bandpass filter is formed in the same way as the notch filter, except that the output polarizer 133 is transmissive of light polarized in the second mode and attenuative of light polarized in the first mode. This filter passes light having a frequency within the defined optical frequency band and attenuates light having a frequency outside said frequency band.

Figure 9:
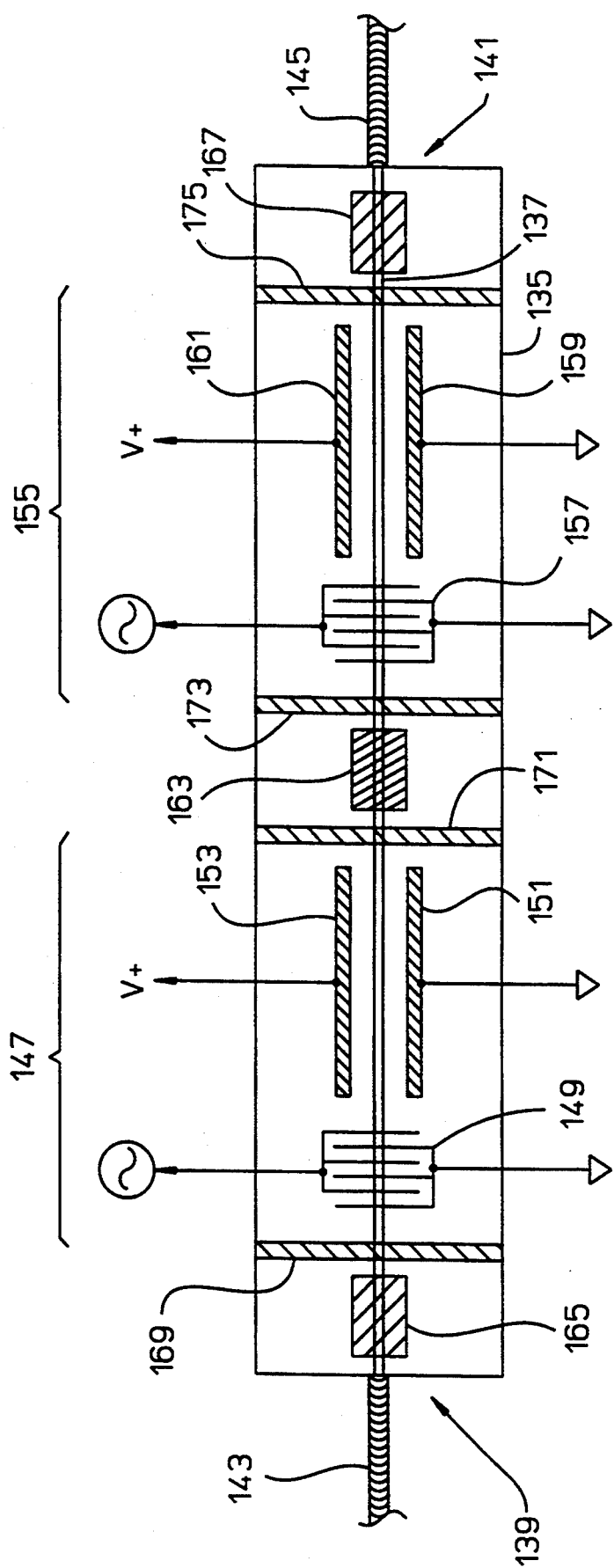
FIG. 9 is a schematic diagram of a two-stage AOTF, each stage of which is generally similar to the AOTF shown in FIG. 6.

The embodiments as described thus far are all one-stage optical filters. In such a filter, the interaction between the light beam and the acoustic wave in the waveguide has the effect of Doppler-shifting the frequency of the light beam. A second optical filter stage may be added to reverse this Doppler shift. Although two separate AOTFs connected in series could serve as the first and second stages of a two-stage filter, it is often better to fabricate both stages in a single substrate. Such a two-stage filter is shown in FIG. 9.

The two-stage filter is fabricated in an elongated substrate 135 of $LiNbO_3$ or other suitable material. A waveguide 137 is formed in an upper surface of the substrate by indiffusion of titanium or another suitable material. The waveguide extends from a first extremity 139 of the substrate to a second extremity 141. An input beam of light is received at the first extremity through an input optical fiber 143. The light passes through the waveguide to the second extremity where it is coupled into an output optical fiber 145.

The first AOTF stage, generally 147, includes a first transducer 149 and a first plurality of electrodes 151 and 153 adjacent the waveguide. These components are generally similar to the transducer 111 and electrodes 115 and 117 as shown in FIG. 6. The transducer is driven by an external signal source (not shown) that is similar to the source 113 of FIG. 6. A voltage source (not shown) similar to the voltage source 119 of FIG. 6 is connected to the electrodes 151 and 153 to generate an electric field through the waveguide in the first stage of the filter.

The second AOTF stage, generally 155, includes a second transducer 157 and a second plurality of electrodes 159 and 161 adjacent the waveguide. The second transducer is driven by an external signal source (not shown); the same signal source as used to drive the first transducer 149 or a separate signal source may be used as convenient. Either the same voltage source that is used for the first stage or a separate source, as may be convenient, is connected to the electrodes 159 and 161 to generate an electric field through the waveguide in the second stage.

A midsection polarizer 163 is located between the first and second stages. This polarizer passes light polarized in a first mode and attenuates light polarized in a second mode.

If a two-stage bandpass filter is desired, input and output polarizers 165 and 167 are placed adjacent the first and second extremities 139 and 141, respectively. The input and output polarizers both pass light polarized in the second mode and attenuate light polarized in the first mode. The polarizers may be integrally formed in the substrate, as in the embodiment shown, or they may be located at some convenient point in the input and output light paths. A two-stage notch filter may be formed by configuring all three polarizers 163, 165 and 167 to pass light that is polarized in the same mode.

In some embodiments it may be desirable to isolate the acoustic wave produced by the first transducer 149 in the first stage portion of the waveguide from the acoustic wave produced by the second transducer 157 in the second stage portion of the waveguide. This may be done by means of one or more acoustic absorbers. In the embodiment as illustrated, the first stage 147 is located between a pair of acoustic absorbers 169 and 171 and the second stage 155 is located between a second pair of acoustic absorbers 173 and 175. The acoustic absorbers may be made of wax or some other suitable material.

An advantage of the two-stage AOTF is that different optical properties may be controlled in each stage.

For example, in a bandpass filter the potential applied to the first plurality of electrodes 151 and 153 may be adjusted to attenuate sidelobes on one side of the pass band while the potential applied to the second plurality of electrodes 159 and 161 is adjusted to attenuate sidelobes on the other side of the pass band. The result is a two-stage filter having good side-lobe rejection on both sides of the pass band.

In another embodiment, the potential applied to each stage is adjusted so as to tune that stage toward a desired optical frequency and thereby align the two stages to the same optical frequency band.

A two-stage AOTF may be used to modulate a light beam. A modulation signal is provided by an external source (not shown) and applied to the electrodes in both stages of the AOTF. The modulation signal as applied to the first plurality of electrodes 151 and 153 is biased to detune the filter in one direction. Similarly the modulation signal as applied to the second plurality of electrodes 159 and 161 is biased to detune the filter in the opposite direction. The result is an output beam of light modulated with the information carried by the modulation signal.

For many applications, an electric field that is longitudinally uniform along the base will be suitable. Such a field is provided by electrodes such as those depicted in FIGS. 6 through 9 that are located parallel the waveguide and that are spaced apart from each other by a constant distance "d" as indicated in FIGS. 6 and 7. For other applications a spatially-varying electric field will be preferable. One way such a field may be generated is by replacing one of the electrodes, for example the electrode 117 of FIG. 6, with a set of subelectrodes 177, 179 and 181 arranged on the opposite side of the waveguide from the electrode 115. This configuration is shown in FIG. 10. Each of the subelectrodes is placed adjacent a different part of the waveguide than the other electrodes. A different potential is applied to each subelectrode to generate electric fields of different strengths through the different parts of the waveguide.

The configuration shown in FIG. 10 provides a field that varies longitudinally in discontinuous increments along the base. An electric field that varies smoothly along the base may be provided by using a resistive element 183 for one of the electrodes, as shown in FIG. 11. A voltage applied across the resistive element provides a voltage drop that extends smoothly from one end of the electrode to the other, resulting in a continuously spatially-varying electric field through the base.

Figure 12:
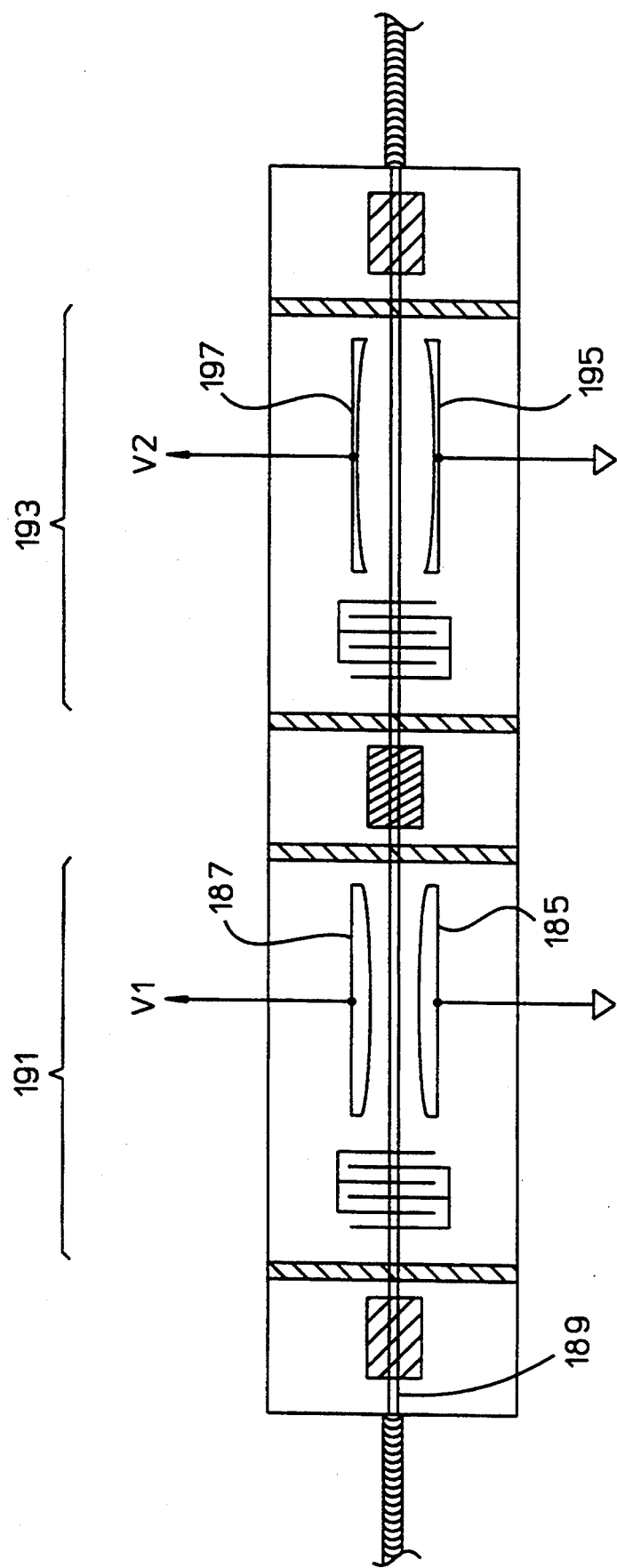
FIG. 12 is a schematic of a two-stage AOTF similar to that shown in FIG. 9 but with the electrodes shaped to provide a spatially-varying electric field.

A smoothly spatially-varying field may also be obtained by configuring the electrodes such that one of them is spaced apart from the other by a longitudinally-varying interval. An example of this is illustrated in FIG. 12. A first pair of electrodes 185 and 187, each curved convexly toward a waveguide 189, is used to generate a longitudinally-varying field in a first filter stage 191 of a two-stage AOTF. The field is stronger near the center of the electrodes and weaker toward the extremities of the electrodes. Other shapes may be used to obtain other field strength profiles as desired. For example, in a second filter stage 193, a second pair of electrodes 195 and 197, each curved concavely toward the waveguide, is used to generate a field that is weaker at the center of the electrodes and that grows stronger toward the extremities of the electrodes.

Figure 13:
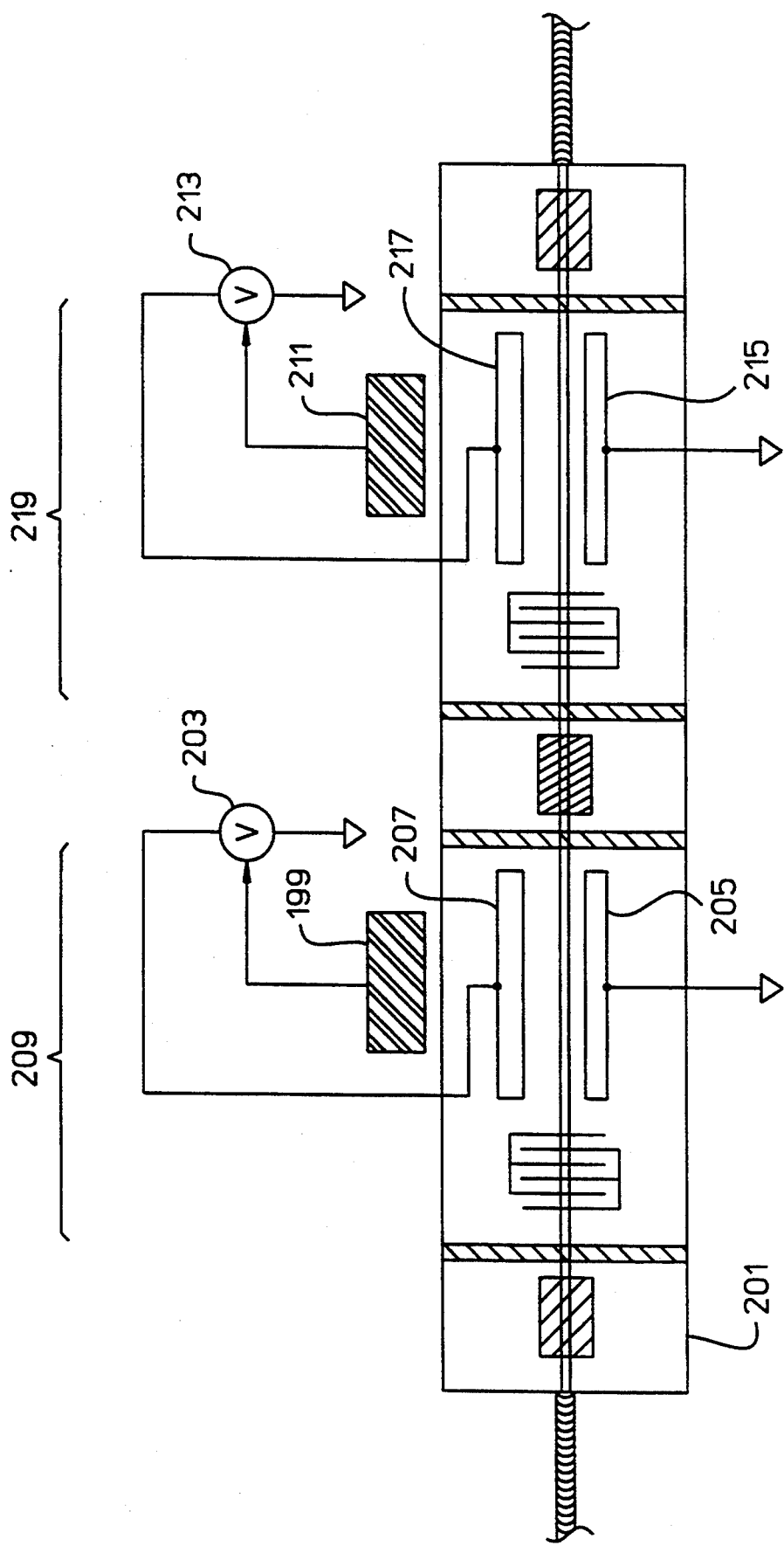
FIG. 13 is a schematic of a two-stage AOTF similar to that shown in FIG. 9 and including a thermistor to control the voltage source.

In addition to using various configurations of electrodes, different potentials may also be used to generate various electric fields. For example, the voltage source 119 as shown in FIG. 6 may be adjusted to generate a field that changes birefringence just enough to compensate for any degradation of filter performance due to fabrication defects in the waveguide region of the base. Or the voltage source may be adjusted to generate a potential that compensates for any degradation of filter performance due to environmental effects. For example, as shown in FIG. 13, a thermistor 199 senses the temperature of an AOTF base 201 and causes a controllable voltage source 203 to apply an appropriate voltage across a pair of electrodes 205 and 207 to generate an electric field that adjusts birefringence to counteract any adverse effects of a change in temperature. For very precise temperature compensation, different fields may be used in different sections of the AOTF. For example, in the embodiment shown in FIG. 13 the components 199, 203, 205 and 207 are used to compensate for temperature changes in a first section 209 of the AOTF. A second thermistor 211, a second controllable voltage source 213, and a second pair of electrodes 215 and 217 are used to compensate for temperature changes in a second section 219 of the AOTF.

Figure 14:
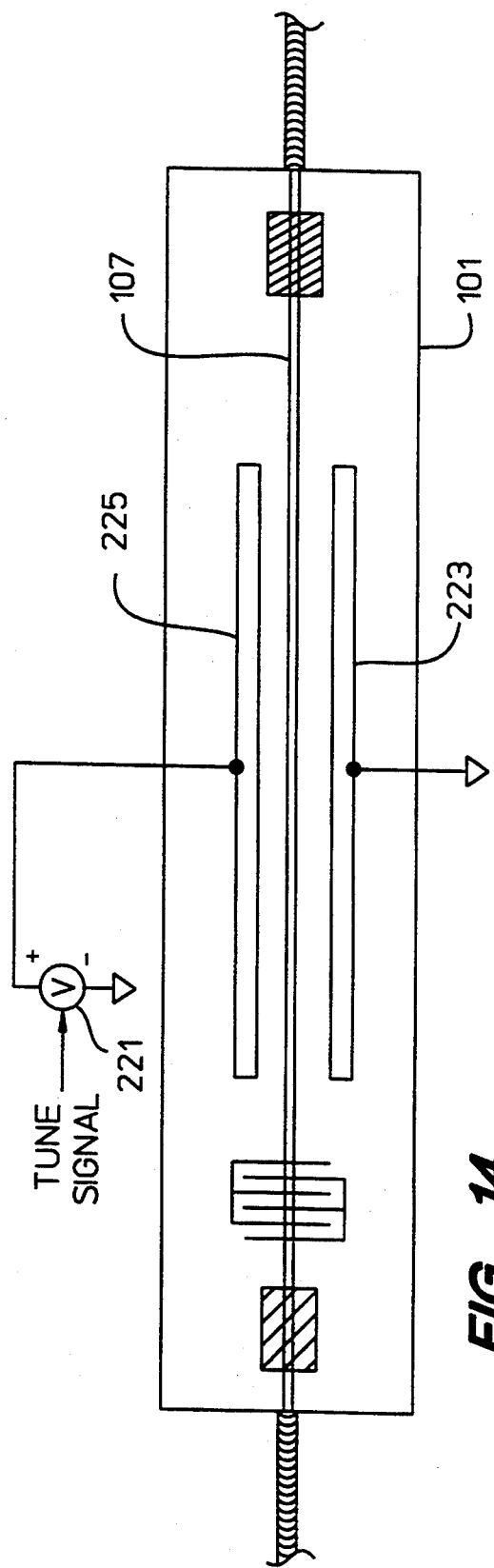
FIG. 14 is a schematic of an AOTF similar to that shown in FIG. 6 but wherein the voltage source is controlled by a tuning signal.

In another embodiment, a tuning signal controls the voltage source to tune the AOTF to a desired center frequency. It is known that an AOTF according to the prior art may be tuned by changing the frequency of the signal that drives the transducer. By changing the transducer frequency, the AOTF can be tuned over a relatively wide range of frequencies, but there is a finite delay after the transducer drive frequency is changed before the AOTF responds with a changed center frequency. Applying the principles of the invention and tuning an AOTF by varying the voltage across the electrodes tunes the AOTF much faster than tuning in the conventional way, albeit over a narrower range of frequencies. An AOTF tunable according to the principles of the invention is illustrated in FIG. 14, wherein a voltage source 221 responds to a tuning signal to apply a tuning potential across electrodes 223 and 225.

Figure 15:
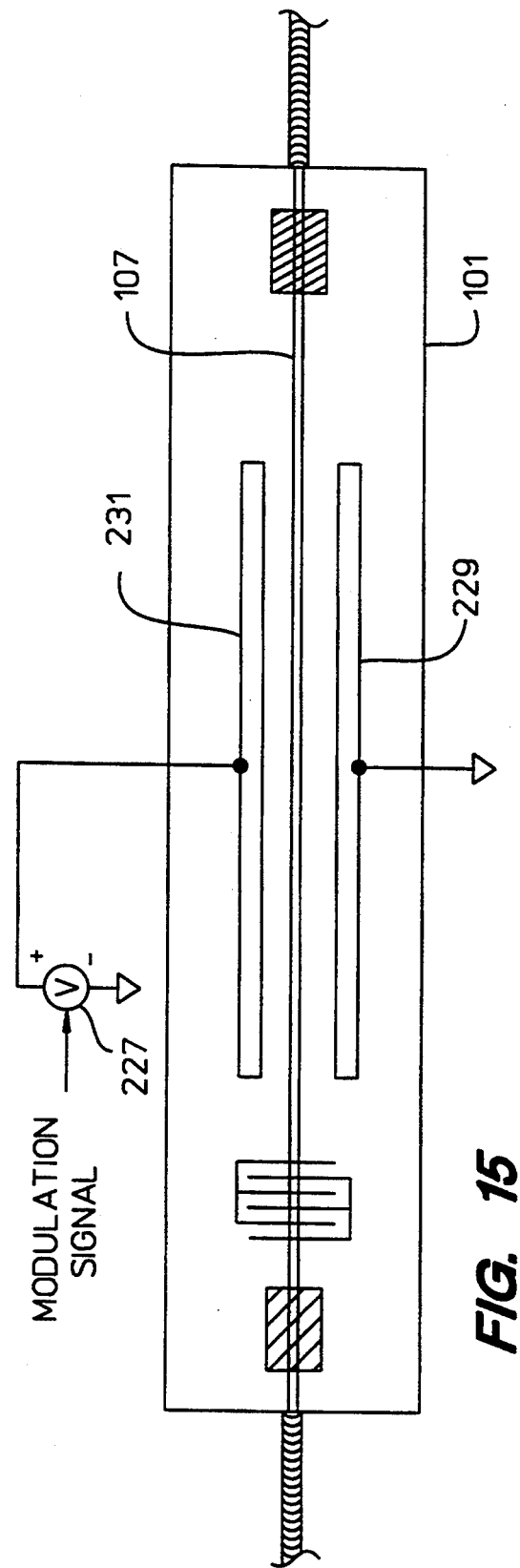
FIG. 15 is a schematic of an AOTF similar to that shown in FIG. 6 but wherein the voltage source modulates the field in response to a modulation signal.

In still another embodiment, as shown in FIG. 15, a voltage source 227, typically an amplifier, responds to a modulation signal to generate an alternating-current potential across a pair of electrodes 229 and 231 and thereby modulate light traveling through a waveguide 233 with information carried by the modulation signal.

Figure 16:
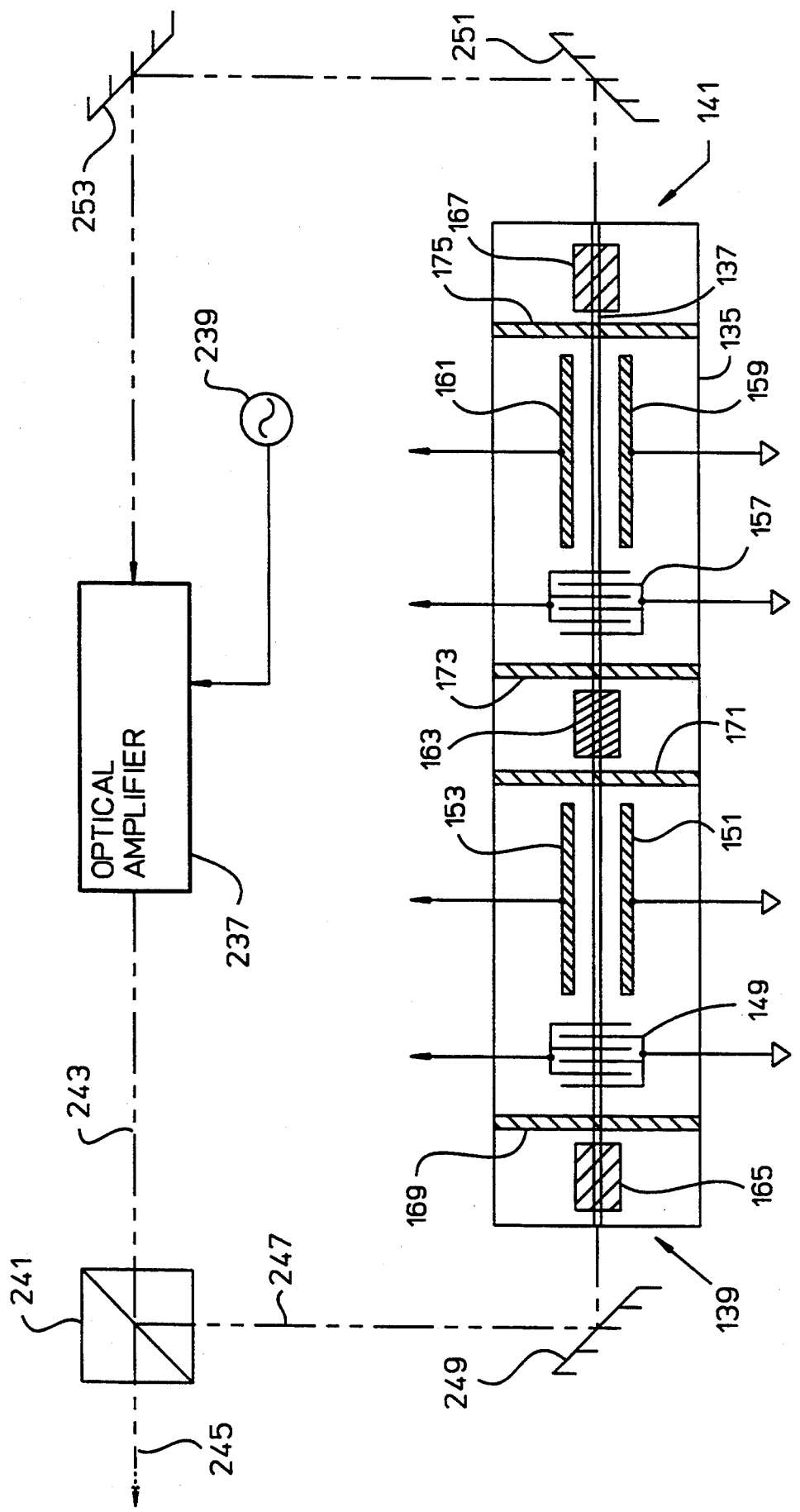
FIG. 16 is a partial schematic of an electronically-tunable external-cavity laser embodying the principles of the invention.

An AOTF embodying the principles of the invention finds numerous applications throughout the field of optics. One of the most important of these applications is as the tuning element of a tunable laser. An example of such a tunable laser is illustrated in FIG. 16. An AOTF generally 235 is included in this laser. The AOTF 235 is similar to the two-stage AOTF shown in FIG. 9, and for convenience components in FIG. 16 that are similar to components in FIG. 9 are assigned the same reference numerals and will not be discussed further. It will be apparent that various other AOTF embodiments as discussed and illustrated above could be used in the laser shown in FIG. 16 instead of the AOTF 235.

In addition to the AOTF 235, the tunable laser includes an optical amplifier 237 for amplifying an optical signal, a power supply 239 for powering the optical amplifier, and optical guide means defining an optical path along which a beam of light is guided from the amplifier to the first extremity 139 of the AOTF 235 and from the second extremity 141 of the AOTF back to the amplifier. The guide means also provides a portion of the beam of light as an output laser beam. In the illustrated embodiment, the guide means includes a beam splitter 241 that receives a beam of light 243 from the amplifier, provides a first portion 245 of the beam of light as an output beam, and guides a second portion 247 of the beam of light to a mirror 249 which reflects it toward the first extremity 139 of the AOTF. Another mirror 251 reflects the beam of light from the second extremity 141 of the AOTF toward a third mirror 253 which in turn reflects it back to the amplifier.

The AOTF tunes the laser very rapidly over a relatively narrow bandspread according to the potential applied to the electrodes, or relatively slowly over a wider bandspread according to the frequency of the acoustic wave, or both, as may be desired.

A more detailed explanation of the principles of the invention will now be provided. In an optical waveguide, the TE and TM mode coupling after propagating through a distance z in the presence of a standing acoustic wave ("SAW") is described by the following pair of coupled differential equations:

$$\frac{dA_1}{dz} = -i\kappa A_2 e^{i\Delta\beta z} \quad (1a)$$

$$\frac{dA_2}{dz} = -i\kappa^* A_1 e^{i\Delta\beta z} \quad (1b)$$

where $A_1$ and $A_2$ represent the TE and TM mode amplitudes, respectively, $\kappa$ is a coupling factor proportional to the SAW amplitude, and $\Delta\beta$ is a phase mismatch factor defined by the following equation:

$$\Delta\beta = \frac{2\pi \Delta n}{\lambda} - \frac{2\pi f_a}{v_a} \quad (2)$$

where $\Delta n$ is the effective bimodal birefringence (this is nearly equal to the crystal birefringence), $f_a$ is the acoustic frequency, and $v_a$ is the acoustic velocity.

Optimum coupling between modes occurs when $\Delta\beta=0$, or equivalently when $f_a = v_a \Delta n/\lambda$. This relation determines the optical center frequency $\lambda$ of the filter for a given drive frequency $f_a$. As long as $\Delta n$ is independent of the propagation distance z, which is the usual assumption, then Equations (1a) and (1b) are a pair of first-order differential equations which can easily be solved. With initial conditions $A_1(0)=0$ and $A_2(0)=1$, then the conversion efficiency $P_1(z) = A_1 A_1^*$ is given by:

$$P_1(z) = \frac{\kappa^2}{(\kappa^2 + \Delta\beta^2/4)} \sin^2((\kappa^2 + \Delta\beta^2/4)^{\frac{1}{2}}z) \quad (3)$$

100% conversion efficiency occurs when $\Delta\beta=0$ and $\kappa z=\pi/2$.

Figure 4:
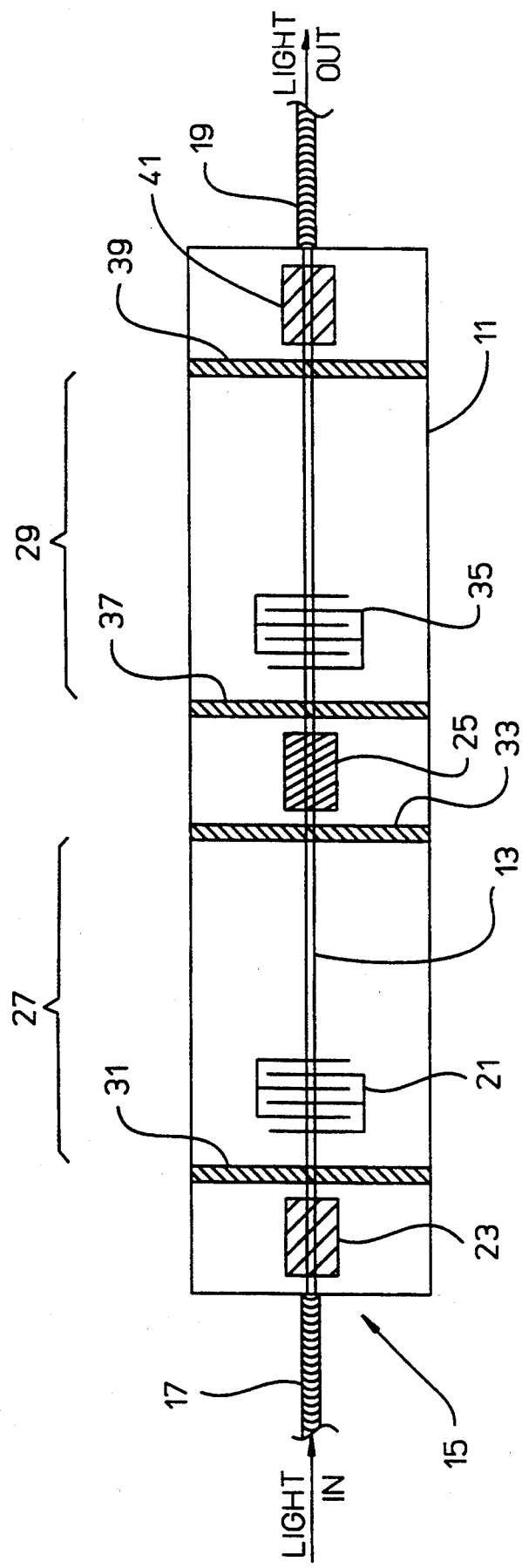
FIG. 4 is a schematic diagram of an integrated AOTF according to the prior art.

An AOTF has been fabricated on an X-cut, Y-propagating LiNbO$_3$ substrate for which $v_a=3750$ m/sec and $\Delta n=0.07329$. This filter has a bandpass wavelength of 1315 nm when the RF drive frequency is 209 MHz. Approximately 100% conversion efficiency is achieved for an RF drive power of 100 mW in an interaction length of 17 mm. Using these parameters, the conversion efficiency versus frequency detuning from $f_a$ over a 2 MHz span results in asymmetrical sidelobes as shown in FIG. 4. The sidelobes are less than 10 dB down. These sidelobes can be reduced by cascading filter stages or by varying acoustic coupling along the length of the AOTF, as mentioned above, but these attempts have not been satisfactory. Actual sidelobes have always been much higher than theoretically predicted because of nonuniform birefringence in the waveguide. This is due to such factors as thermal gradients, variations in the width and thickness of titanium stripes used to make the waveguides, and variations in crystal stoichiometry across the waveguide.

Figure 1:
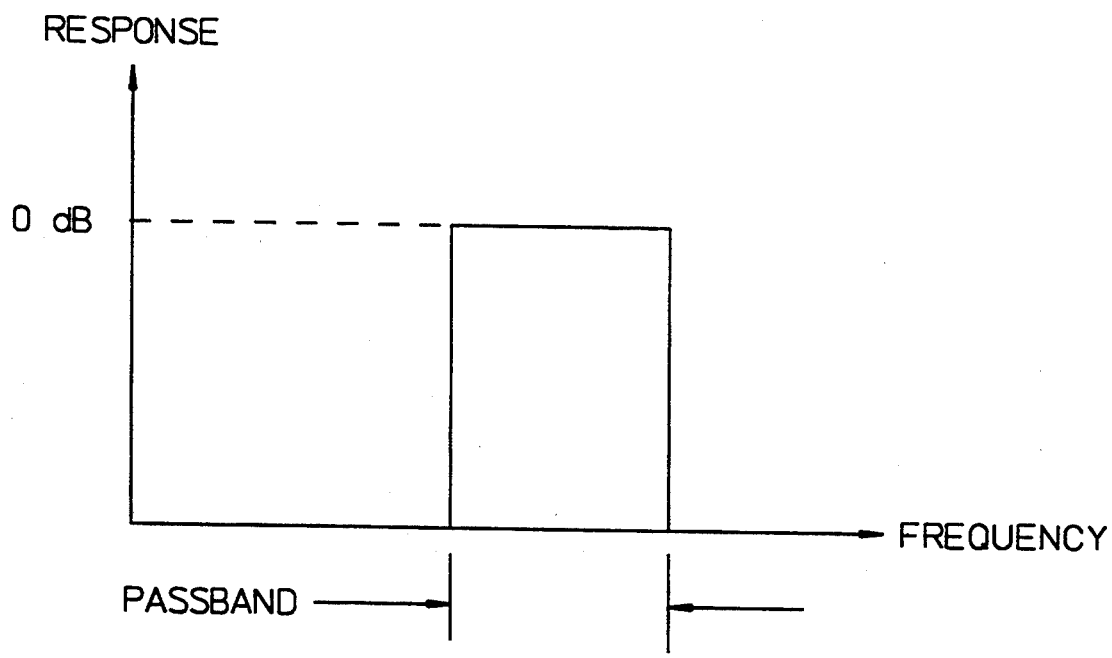
FIG. 1 shows the frequency response of an ideal bandpass filter.
Figure 2:
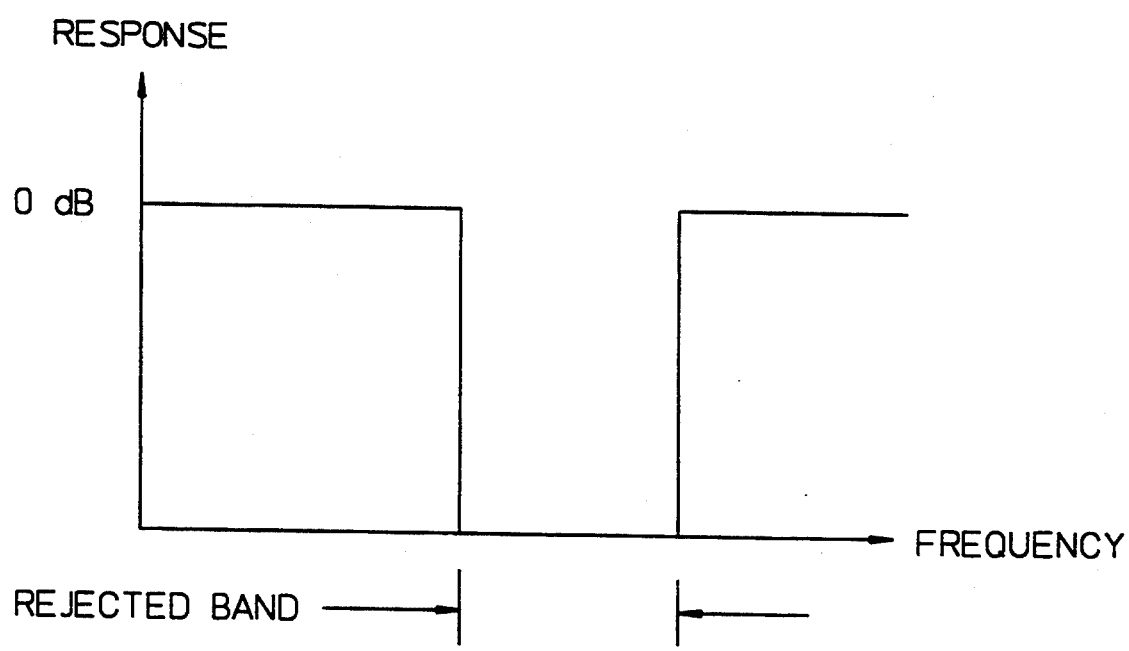
FIG. 2 shows the frequency response of an ideal notch filter.
Figure 3:
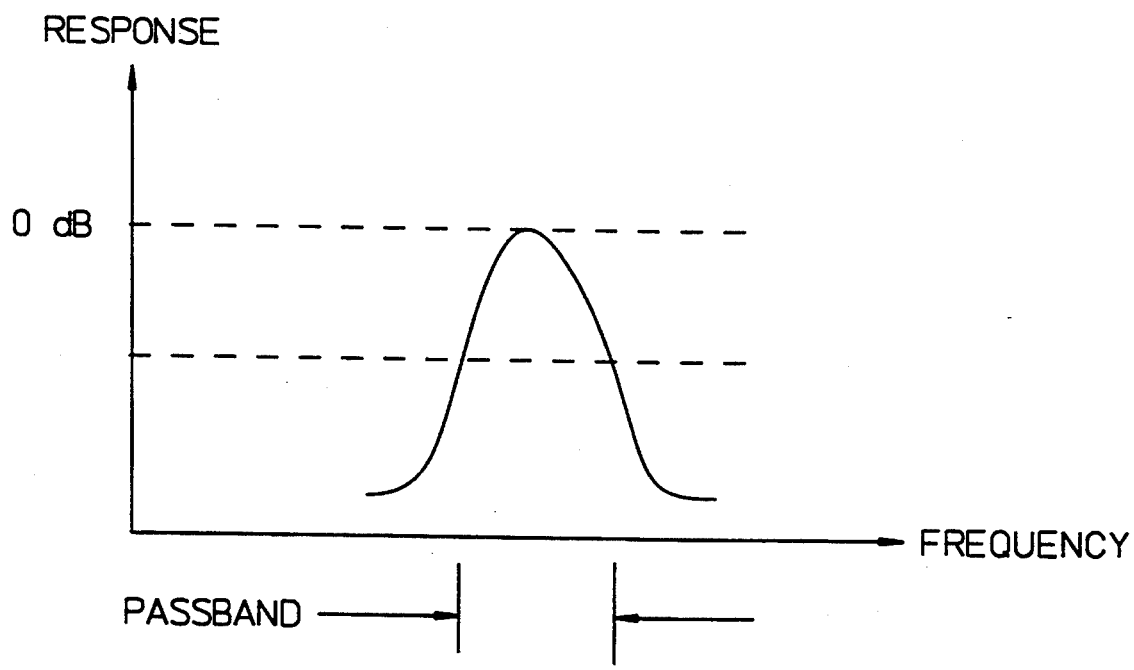
FIG. 3 shows the frequency response of a good-quality, realizable bandpass filter.
Figure 5:
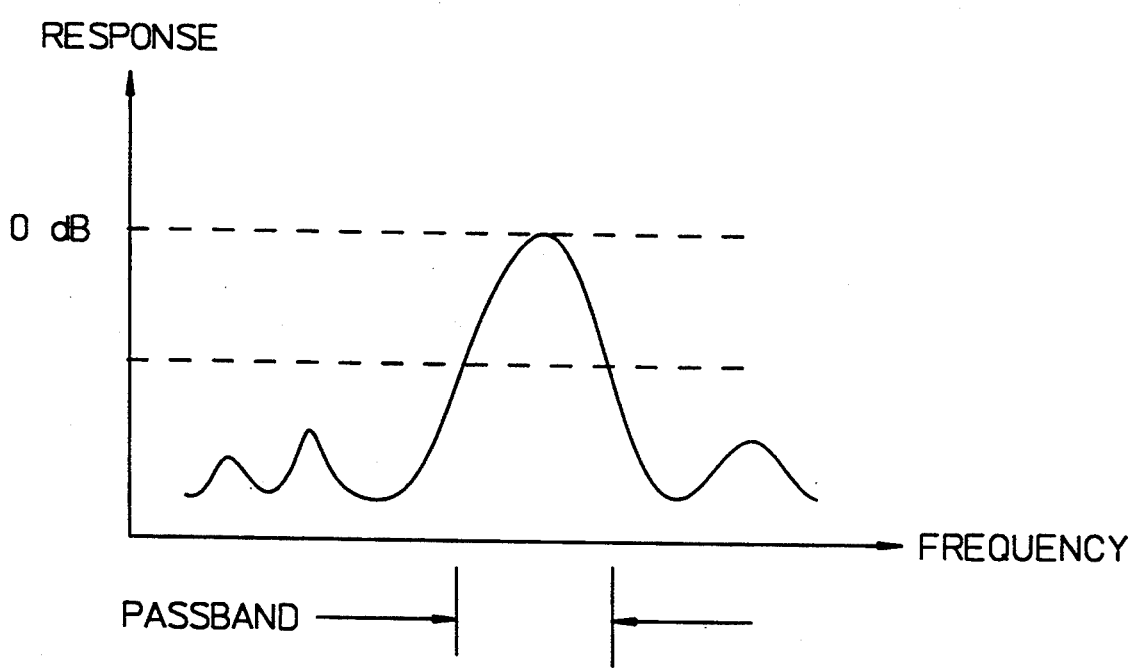
FIG. 5 shows the frequency response of a prior art AOTF.

Birefringence in an LiNbO$_3$ substrate can be controlled by an electric field. For the AOTF illustrated in FIG. 5, fabricated on an X-cut, Y-propagating LiNbO$_3$ substrate, the change in birefringence $\delta\Delta n$ with applied voltage is given by:

$$\delta\Delta n = \delta\Delta n_{TE} - \delta\Delta n_{TM} \approx \frac{1}{2}(n_e^3 r_{33} - n_o^3 r_{13})\Gamma V/d \quad (4)$$

where d is the distance between the electrodes, $\delta\Delta n_{TE}$ and $\delta\Delta n_{TM}$ are the variations in the effective index for the TE and TM modes, respectively, $n_e$ and $n_o$ are the extraordinary and ordinary indices of LiNbO$_3$, and $r_{33}$ and $r_{13}$ are elements of the electro-optic tensor for LiNbO$_3$. The factor $\Gamma$ represents the overlap between the optical and electric fields and takes on values of approximately 0.65 for typical geometries. Small errors that may arise from non-uniformities in the field between the electrodes are ignored. Inserting numerical values for the material constants gives:

$$\delta\Delta n = 6.8 \times 10^{-5} V/d \quad (5)$$

where V is in volts and d is in $\mu$m. For LiNbO$_3$, field strengths of 100 kV/cm are possible before breakdown. This would yield a maximum birefringence control of $\delta\Delta n_{max} \approx \pm 7 \times 10^{-4}$. With an electrode gap $d=10\mu$m this would require an applied voltage of 100 volts.

The range of birefringence correction that can be achieved by a voltage of about 100 volts is adequate to compensate for the ranges of temperatures and physical variations in the waveguide that are likely to be encountered in practice. The effects of variations in temperature, titanium strip width and thickness variations of the substrate are expressed as follows (to first order):

$$\frac{\partial \Delta n}{\partial T} = -3.7 \times 10^{-5}/°C. \quad (6a)$$

$$\frac{\partial \Delta n}{\partial W} = 5.3 \times 10^{-4}/\mu m \quad (6b)$$

$$\frac{\partial \Delta n}{\partial \tau} = 3.3 \times 10^{-6}/Å \quad (6c)$$

where T, W and $\tau$ represent temperature, titanium strip width, and thickness of the substrate, respectively. A $\pm 7 \times 10^{-4}$ change is equivalent to a temperature variation of $\pm 19°$ C., a titanium strip thickness variation of $\pm 200$Å, or a waveguide width variation of $\pm 1.3\mu$m, all of which are larger than the variations likely to be experienced in practice.

For applications such as compensating for temperature changes and correcting for unwanted shifts in the center wavelength, parallel rectangular electrodes such as those shown in FIGS. 6 and 9 may be used. For situations in which it is desired to correct for variations along the length of a waveguide, multisection or resistive electrodes such as those shown in FIGS. 10 and 11, respectively, may be used. Trutna et al. discuss specific birefringence distributions that may be employed to attenuate sidelobes on one side or the other of the bandpass center frequency. Curved electrodes such as the convex and concave electrodes shown in FIG. 12 are particularly well suited to lowering the overall sidelobes by applying Trutna's technique to each side of the transmission function.

As discussed above, the principles of the invention may be applied to tune the AOTF as well as to compensate for temperature and physical variations and to suppress sidelobes. In a conventional AOTF, tuning is accomplished by shifting the drive frequency of the transducer. The speed at which the frequency of the AOTF can change in response to such a shift in drive frequency is limited by the time it takes for a SAW to travel along the length of the waveguide. In a typical two-stage AOTF such as the one shown in FIG. 9, the length of the waveguide in one stage is about 17 mm and the acoustic velocity of the SAW is about 3660 m/sec, resulting in a transit time of 4.6μsec. Thus, the maximum rate at which the AOTF can change frequencies is about 100,000 times per second, and this in turn determines the maximum tuning rate of a laser that uses an AOTF as a tuning element.

The center wavelength of the AOTF passband is a function of birefringence as well as of the acoustic drive frequency. This center wavelength is given by $$\lambda_o = (n_{TM} - n_{TE})\Lambda = \Delta n \Lambda \quad (7)$$

where $n_{TE}$ and $n_{TM}$ are the effective indices of the TE and TM modes, respectively, $\Delta n$ is the difference between those indices, and $\Lambda$ is the wavelength of the SAW. Applying a voltage changes the center wavelength of the filter to $$\lambda(V_T) = \lambda_0 + \delta\Delta n(V_T)\Lambda = \lambda_0(1 + \delta\Delta n(V_T)/\Delta n) \quad (8)$$

which results in the electro-optical tuning range given by $$\Delta\lambda = 2\delta\Delta n_{max}\lambda_0/\Delta n \quad (9)$$

where the factor of two indicates the total range possible with positive and negative applied voltages.

As noted above, the maximum birefringence change which can be generated is $\delta\Delta n \approx \pm 7 \times 10^{-4}$. For a center wavelength of 1550 nm, where the acousto-optic material has a birefringence of $\Delta n = 0.072$, this corresponds to a tuning range of about 30 nm. While this tuning range is much smaller than the 150 nm that can be obtained through acoustic frequency tuning, it has the advantage of being much faster. In fact, tuning rates greater than 100 MHz are easily achieved. realizable. Tuning rates beyond 1 GHz are possible, although with a more limited tuning range due to the difficulties of generating high voltages at this speed.

A test of the foregoing was performed on a single-section AOTF. The interaction length was 50 mm. Waveguides with widths of 5, 6 and 7 μm were formed by titanium indiffusion. The titanium thickness was 1075Å and was diffused for six hours at 1050° C. in wet O₂. No polarizers were integrated on the device. Both single and three-section birefringence control electrodes were included. The electrode gap was about 12 μm and the metal width was 20 μm. The SAW transducer was a 10-pair split-finger interdigitated design. The electrode is designed for an acoustic center wavelength of 20 μm which yields an optical center wavelength of about 1.55 μm. The aperture was about 2.1 mm.

The filter was tested with a 1.55 μm wavelength DFB coupled to the chip with a Fujikura "PANDA" polarization preserving fiber. The TM mode was found to be very lossy (about 4 dB/cm), presumably due to metal loading of the tuning electrodes. Thus, TE light was coupled to the devices. The output was observed through a TE pass polarizer. Thus, a notch type filter response was observed at the phasematched acoustic frequency. The TM loss can be avoided by increasing the electrode gap or by adding a dielectric buffer layer beneath the electrodes. This would not limit the tuning range but would result in a larger range of voltages for a given tuning effect.

Figure 17:
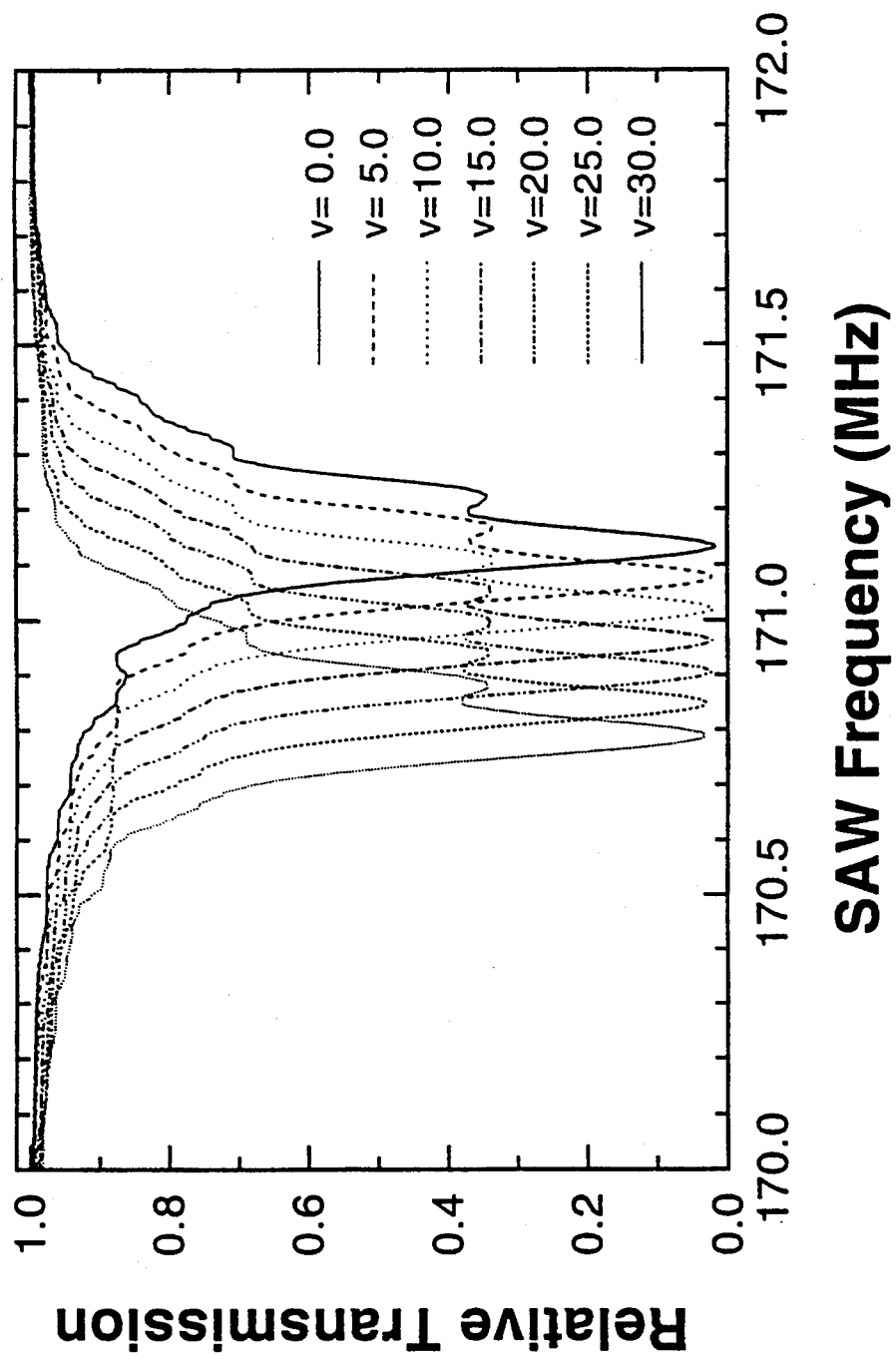
FIG. 17 shows the response of an AOTF similar to the AOTF shown in FIG. 6.
Figure 18:
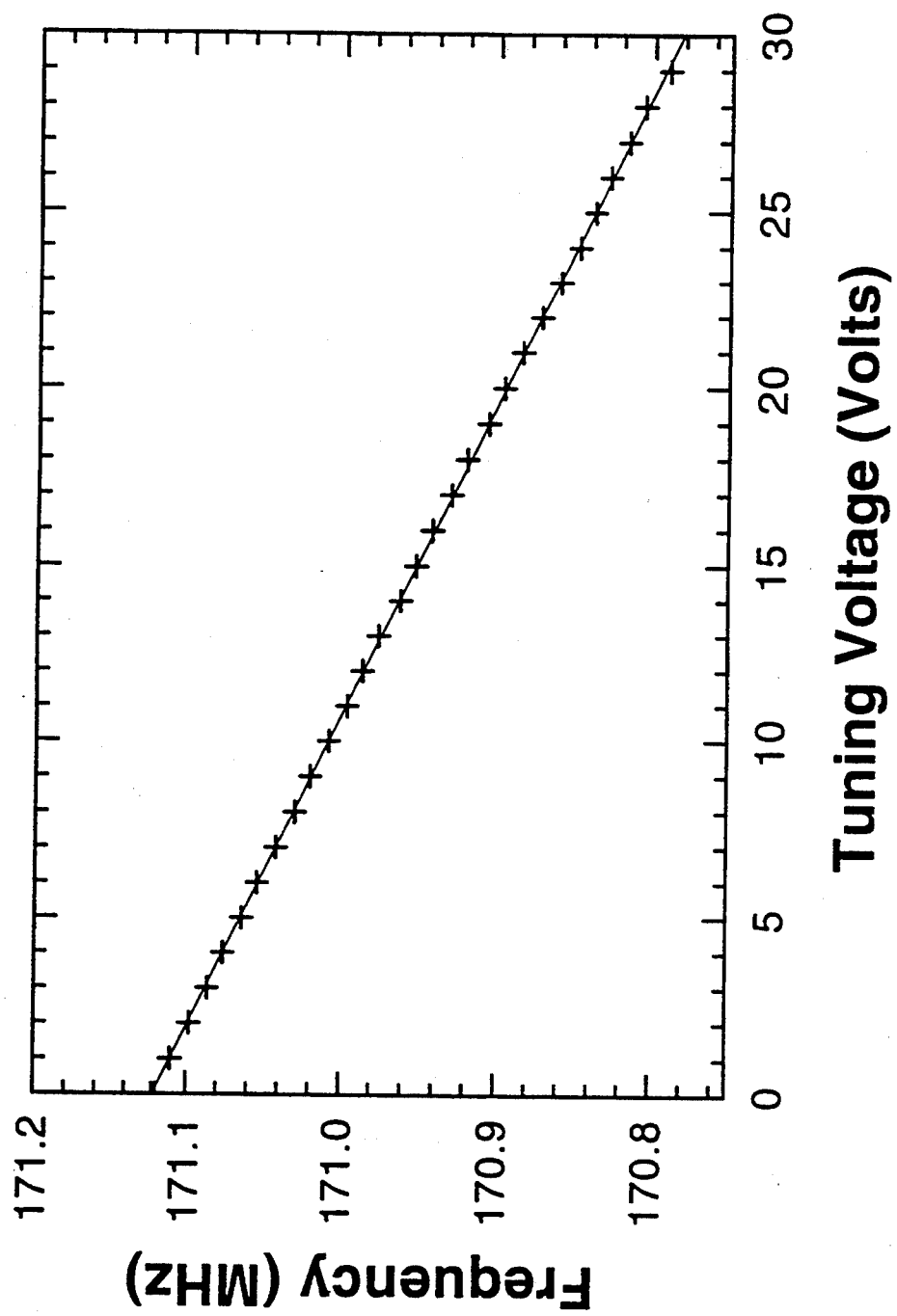
FIG. 18 shows the measured frequency of peak conversion plotted against the tuning voltage of the AOTF having the frequency response depicted in FIG. 17.

FIG. 17 shows the filter response of a device with a single-section tuning electrode. The data are transmission plotted against acoustic frequency (this is equivalent to transmission against optical frequency) for a range of DC voltages applied to the electrodes. FIG. 18 shows the measured frequency of peak conversion plotted against the tuning voltage. From this data a tuning sensitivity of 0.103 mm/V is calculated. Assuming a SAW velocity of 3750 m/sec yields a birefringence at zero voltage of about 0.071. This would indicate an overlap factor $\Lambda = 0.56$.

To measure the speed of this tuning technique, the device was set to an acoustic frequency corresponding to about the 50% transmission point of the filter response. Then an electrical modulation was applied to the tuning electrode and the resulting modulation of the output signal was measured with a Hewlett-Packard 71400 lightwave signal analyzer. The response was found to be flat out to about 150 MHz with a rolloff thereafter. This speed is limited by the microwave loss in the relatively thin (400 nm) electrodes, the long bond wires, and the lack of termination on the electrodes. Even so, this is more than three orders of magnitude faster than what is possible with SAW frequency tuning.

Figure 19:
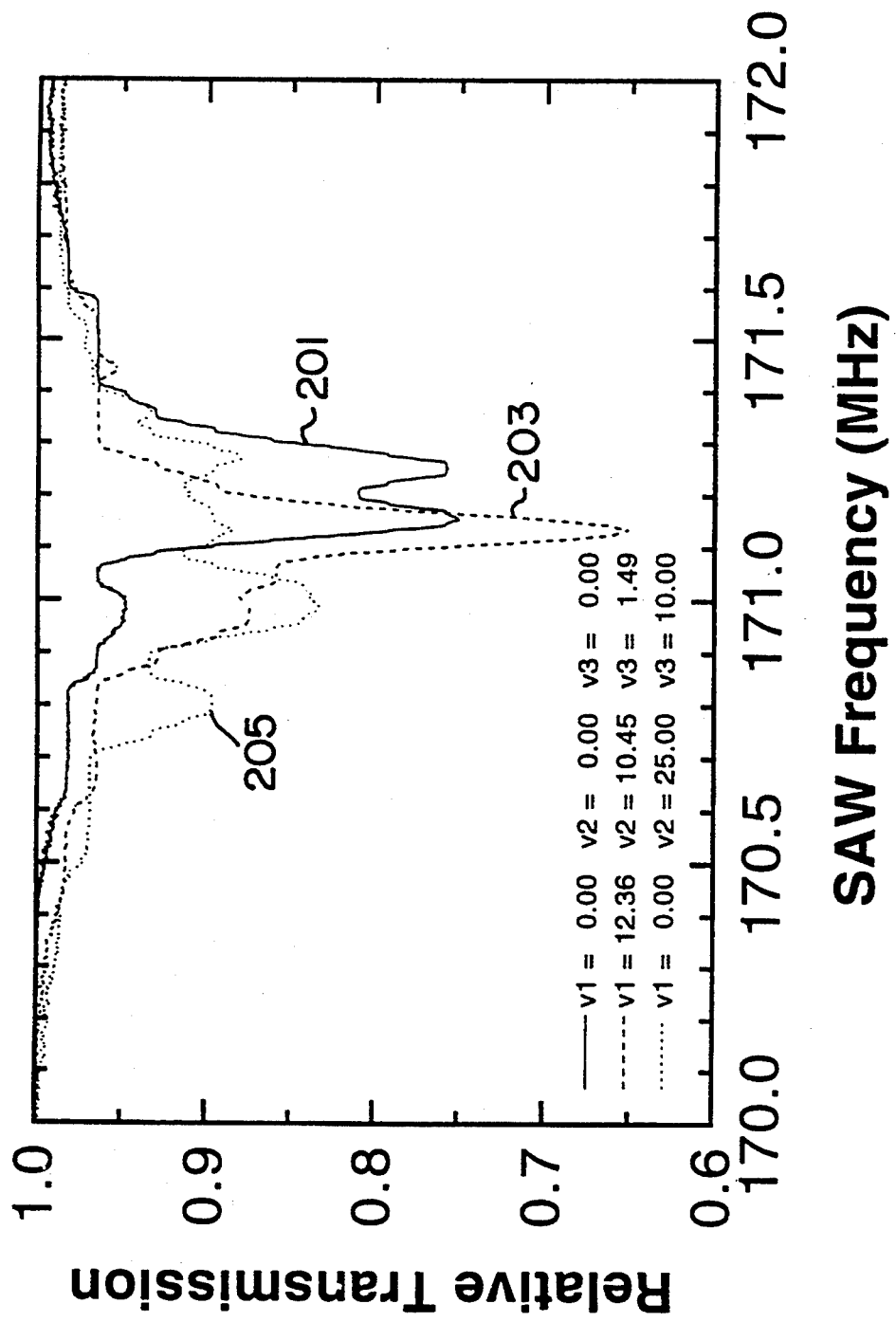
FIG. 19 shows tuning curves of an AOTF similar to the AOTF depicted in FIG. 10.

FIG. 19 shows tuning curves for a device with an electrode split into three parts, similar to the electrodes shown in FIG. 10. The solid curve 201, showing tuning with no applied bias, is very poor. The dashed curve 203, obtained with voltages of 12.36, 10.45 and 1.49 on the three parts shows a much-improved response. The dotted curve 205 is an example of deliberate detuning to give a broader response. This figure also shows that the presence of the electrodes does not significantly attenuate the SAW; this can be seen by observing that all three electrodes influence the shape of the filter response curve, indicating that the SAW is present over the full length of the device.

From the foregoing it will be appreciated that the AOTF provided by the invention offers numerous advantages that have not been attainable. Such an AOTF can be configured and biased to suppress unwanted sidelobes in the filter response, to reduce asymmetrical sidelobes, and to compensate for the effects of temperature and physical device imperfections. In addition, an AOTF embodying the invention has a tuning speed several orders of magnitude faster than can be attained in a conventional AOTF. An AOTF embodying the principles of the invention finds an application as a modulator as well as a filter. A tunable laser that embodies the invention offers faster tuning response and more stable performance than other tunable lasers.

Although certain specific embodiments of the invention have been described and illustrated, the invention is not to be limited to the specific forms or arrangements of parts so described and illustrated, and various modifications and changes can be made. Within the scope of the appended claims, therefore, the invention may be practiced otherwise than as specifically described and illustrated herein.

What is claimed is:

1. An acousto-optic tunable filter comprising:
   a base of birefringent acousto-optic material adapted to receive an incoming beam of light;
   a transducer responsive to an electrical signal to induce an acoustic wave in the base, the acoustic wave operable to change the polarization mode of any light propagating through the base and having a frequency within an optical frequency band defined by the frequency of the acoustic wave and the optical properties of the base but not to change the polarization mode of any light having a frequency outside said optical frequency band; and
   control means for controlling an optical property of the base by adjusting the birefringence of the acousto-optic material.

2. A filter as in claim 1 wherein the control means comprises a plurality of electrodes adjacent the base and a voltage source in electrical communication with the electrodes, the voltage source operative to establish a potential across the electrodes and thereby generate an electric field that extends through the base.

3. A filter as in claim 2 wherein the voltage source comprises means to generate a potential that compensates for any degradation of filter performance due to fabrication defects in the base.

4. A filter as in claim 2 wherein the voltage source comprises means to generate a potential that compensates for any degradation of filter performance due to environmental effects on the base.

5. A filter as in claim 2 wherein the voltage source comprises means responsive to a tuning signal to generate a potential that tunes the filter to a desired frequency band.

6. A filter as in claim 2 wherein the voltage source comprises means responsive to a modulation signal to generate a potential that modulates light propagating through the base with information carried by the modulation signal.

7. A filter as in claim 2 and further comprising input and output polarizers disposed adjacent opposite extremities of the base such that an input beam of light passes through the input polarizer, then the base, and then the output polarizer, the input polarizer and the output polarizer both being transmissive of light polarized in a first mode and attenuative of light polarized in a second mode to thereby define a notch filter that passes light having a frequency outside the defined optical frequency band and attenuates light having a frequency within said frequency band.

8. A filter as in claim 2 and further comprising input and output polarizers disposed adjacent opposite extremities of the base such that an input beam of light passes through the input polarizer, then the base, and then the output polarizer, the input polarizer transmissive of light polarized in a first mode and attenuative of light polarized in a second mode, the output polarizer transmissive of light polarized in the second mode and attenuative of light polarized in the first mode to thereby define a bandpass filter that passes light having a frequency within the defined optical frequency band and attenuates light having a frequency outside said frequency band.

9. A filter as in claim 2 wherein the electrodes are configured to generate a spatially-varying electric field through the base.

10. A filter as in claim 9 wherein one of the electrodes comprises a plurality of subelectrodes, each subelectrode disposed adjacent a different region of the base than the other subelectrodes, and wherein the voltage source is operative to apply different potentials to various ones of the subelectrodes and thereby generate electric fields of different strengths through the different regions of the base.

11. A filter as in claim 9 wherein one of the electrodes comprises a resistive element and wherein the voltage source is operative to establish a voltage drop across the resistive element to produce a spatially-varying potential between the electrodes and thereby generate a spatially-varying electric field through the base.

12. A filter as in claim 9 wherein one of the electrodes is spaced apart from another of the electrodes by a spatially-varying interval to produce a spatially-varying electric field through the base.

13. A filter as in claim 2 wherein the base comprises a crystalline substrate and an optical waveguide formed in a surface of the substrate, and wherein the electrodes are disposed adjacent the waveguide.

14. A filter as in claim 13 wherein the crystalline substrate comprises lithium niobate and the waveguide is formed in a surface of the substrate by indiffusion of titanium.

15. A filter as in claim 13 and further comprising a midsection polarizer between a first section of the waveguide and a second section of the waveguide, each section defining a filter stage.

16. A filter as in claim 15 and further comprising input and output polarizers disposed adjacent opposte extremities of the base such that an input beam of light passes through the input polarizer, then the base, and then the output polarizer, the input, midsection and output polarizers being transmissive of light polarized in a first mode and attenuative of light polarized in a second mode to thereby define a two-stage notch filter that passes light having a frequency outside the defined optical frequency band and attenuates light having a frequency within said frequency band.

17. A filter as in claim 15 and further comprising input and output polarizers disposed adjacent opposite extremities of the base such that an input beam of light passes through the input polarizer, then the base, and then the output polarizer, the midsection polarizer being transmissive of light polarized in a first mode and attenuative of light polarized in a second mode and the input and output polarizers each being transmissive of light polarized in the second mode and attenuative of light polarized in the first mode to thereby define a two-stage bandpass filter that passes light having a frequency within the defined optical frequency band and attenuates light having a frequency outside said frequency band.

18. A filter as in claim 15 wherein the voltage source and the electrodes are adapted to apply a first potential across the first section of the waveguide and a second potential across the second section of the waveguide, the first potential adapted to attenuate sidelobes on one side of the defined optical frequency band and the second potential adapted to attenuate sidelobes on the other side of said frequency band.

19. A filter as in claim 15 wherein the voltage source and the electrodes are adapted to receive a modulation signal and in response to the modulation signal to generate a first potential across the first section of the waveguide and a second potential across the second section of the waveguide, the first and second potentials tending to detune the filter in opposing directions and thereby modulate light propagating through the waveguide with information carried by the modulation signal.

20. A filter as in claim 15 wherein the voltage source and the electrodes are adapted to apply a first potential across the first section of the waveguide and a second potential across the second section of the waveguide, the first potential adapted to tune the first filter stage toward a desired optical frequency band and the second potential adapted to tune the second filter stage toward said optical frequency band and thereby align the two stages to the same optical frequency band.

21. A method of controlling an acousto-optic tunable filter, the method comprising generating an electric field, applying the electric field across the acousto-optic tunable filter, and adjusting the intensity of the electric field to control an optical property of the acousto-optic tunable filter, wherein adjusting the intensity of the electric field comprises measuring the temperature of the acousto-optic tunable filter and using the measured temperature to change the intensity of the electric field to compensate for any degradation of filter performance due to any change in the measured temperature.

22. A method as in claim 21 wherein adjusting the intensity of the electric field comprises measuring the temperature at each of a plurality of locations on the acousto-optic tunable filter and using the measured temperatures at each location to change the intensity of the electric field adjacent that location to compensate for any degradation of filter performance due to any change in the measured temperature.

23. A tunable laser comprising:
an optical amplifier for amplifying an optical signal;
a power supply for powering the optical amplifier;
an elongated base of birefringent acousto-optic material with an optical waveguide formed therein;
optical guide means defining an optical path for a beam of light from the amplifier to a first extremity of the waveguide, from a second extremity of the waveguide back to the amplifier, and from the amplifier to a laser beam output;
a transducer responsive to an electrical signal to induce an acoustic wave in the base, the acoustic wave operable to change the polarization mode of any light propagating through the waveguide and having a frequency defined by the acoustic wave and the base;
means for providing an electrical signal to the transducer; and
control means for controlling an optical property of the waveguide by adjusting the birefringence of the acousto-optic material and thereby tuning the laser.

24. A tunable laser as in claim 23 wherein the control means comprises a voltage source and a plurality of electrodes adjacent the waveguide, the voltage source operative to establish a potential across the electrodes and thereby generate an electric field that extends through the optical waveguide.

25. A tunable laser as in claim 24 and further comprising:
an input polarizer in the optical path between the optical amplifier and a first extremity of the waveguide, the input polarizer transmissive of light polarized in a first mode and attenuative of light polarized in a second mode; and
an output polarizer in the optical path between the optical amplifier and a second extremity of the waveguide, the output polarizer transmissive of light polarized in the second mode and attenuative of light polarized in the first mode.

26. A tunable laser as in claim 24 and further comprising:
an input polarizer in the optical path between the optical amplifier and a first extremity of the waveguide, the input polarizer transmissive of light polarized in a first mode and attenuative of light polarized in a second mode;
a midsection polarizer between a first section of the waveguide and a second section of the waveguide, each section defining a filter stage, the midsection polarizer transmissive of light polarized in the second mode and attenuative of light polarized in the first mode; and
an output polarizer in the optical path between the optical amplifier and a second extremity of the waveguide, the output polarizer transmissive of light polarized in the first mode and attenuative of light polarized in the second mode.

* * * * *